(12) United States Patent
Shi (10) Patent No.: US 7,843,800 B2
(45) Date of Patent: Nov. 30, 2010

(54) METHOD, APPARATUS AND SYSTEM FOR CROSSTALK TEST ON MULTI-SUBSCRIBER COMMUNICATION LINES

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 12/049,655

(22) Filed: Mar. 17, 2008

(65) Prior Publication Data

US 2008/0188185 A1    Aug. 7, 2008

Related U.S. Application Data

(63) Continuation of application No. PCT/CN2006/002390, filed on Sep. 14, 2006.

(30) Foreign Application Priority Data

Sep. 16, 2005    (CN)    ......................... 2005 1 0103308

(51) Int. Cl.
*H04J 1/12*    (2006.01)
(52) U.S. Cl. ...................... 370/201; 370/252
(58) Field of Classification Search ......... 370/201–208, 370/241–253; 375/260–265
See application file for complete search history.

(56) References Cited

U.S. PATENT DOCUMENTS

| | | | |
|---|---|---|---|
| 5,870,393 A | 2/1999 | Yano et al. | |
| 6,061,407 A | 5/2000 | Cherubini et al. | |
| 6,459,693 B1 | 10/2002 | Park et al. | |
| 6,611,595 B1 * | 8/2003 | Leckschat et al. | ........... 379/417 |
| 6,647,067 B1 | 11/2003 | Hjelm et al. | |
| 6,744,813 B1 | 6/2004 | Ko et al. | |
| 6,870,901 B1 | 3/2005 | Gudmundsson et al. | |
| 2002/0041565 A1 | 4/2002 | Valenti et al. | |
| 2003/0202459 A1 * | 10/2003 | Warke et al. | ................. 370/201 |
| 2004/0086064 A1 | 5/2004 | Van Acker et al. | |
| 2005/0047323 A1 * | 3/2005 | Clarkson et al. | ............ 370/203 |

(Continued)

FOREIGN PATENT DOCUMENTS

CN    1468011 A    1/2004

(Continued)

OTHER PUBLICATIONS

Papandreou et al., "Real-Time FEXT Crosstalk Identification in ADSL Systems," *IEEE*, 61-66 (Sep. 2003).

*Primary Examiner*—Ricky Ngo
*Assistant Examiner*—Kan Yuen
(74) *Attorney, Agent, or Firm*—Leydig, Voit & Mayer, Ltd.

(57) ABSTRACT

A method, apparatus, and system for crosstalk test on multi-subscriber communication lines. The core of the invention is: loading a group of orthogonal spread spectrum codes to the transmitting side of each line, and testing the crosstalk of xSDL lines based on the received signal vector at the receiving side so that the source, amplitude, and phase of the crosstalk can be identified. With the invention, crosstalk test can be implemented in real time on xSDL lines without impacting the transmission performance of other lines. In addition, the test result shows how many lines have a significant impact on the line under test and reflects the severity of the impact, providing a powerful basis for dynamic spectrum management, and optimization of DSLAM system performance.

11 Claims, 6 Drawing Sheets

U.S. PATENT DOCUMENTS

2007/0047631 A1 * 3/2007 Bostoen et al. .............. 375/222

FOREIGN PATENT DOCUMENTS

| | | | |
|---|---|---|---|
| CN | 1499734 | A | 5/2004 |
| CN | 1507716 | A | 6/2004 |
| CN | 1529438 | A | 9/2004 |
| DE | EP05291798.6 | * | 8/2005 .................. 375/222 |
| RU | 2213423 | C2 | 9/2003 |
| WO | WO 00/59125 | A1 | 10/2000 |

* cited by examiner

METHOD, APPARATUS AND SYSTEM FOR CROSSTALK TEST ON MULTI-SUBSCRIBER COMMUNICATION LINES

CROSS-REFERENCE TO RELATED APPLICATIONS

This application is a continuation of International Patent Application No. PCT/CN2006/002390, filed Sep. 14, 2006, which claims priority to Chinese Patent Application No. 200510103308.X, filed Sep. 16, 2005, both of which are hereby incorporated by reference.

FIELD OF THE INVENTION

The present invention relates to network communication technologies, and in particular, to a technology for crosstalk test on multi-subscriber communication lines.

BACKGROUND OF THE INVENTION

Asymmetrical digital subscriber line (ADSL) technology has evolved over the years of development from the first generation ADSL, the second generation ADSL2 and ADSL2+, to the latest very high speed digital subscriber line2 (VDSL2). With the increase of frequency band, bandwidth also increases. ADSL and ADSL2, with the downlink spectrum lower than 1.1 MHz, provide downlink rates as high as 8 Mbps. ADSL2+expands the downlink bandwidth to 2.2 MHz and provides a maximum downlink rate of 24 Mbps. VDSL2 uses a spectrum of up to 30 MHz on the downlink, and provides an uplink-downlink symmetrical rate of 100 Mbps.

Figure 1:
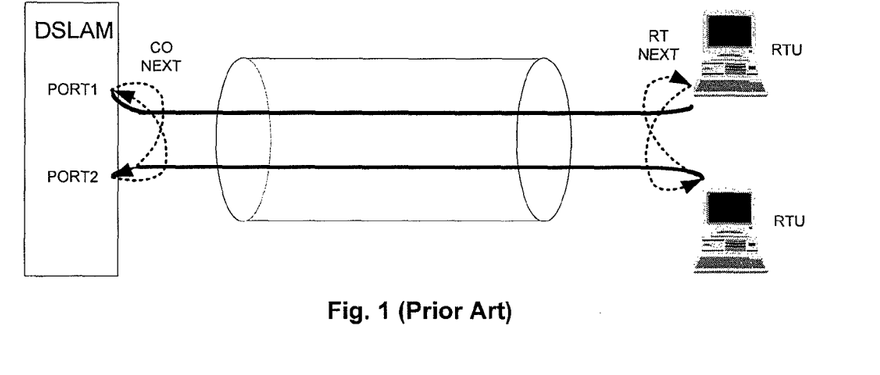
FIG. 1 shows the schematic diagram of NEXT.
Figure 2:
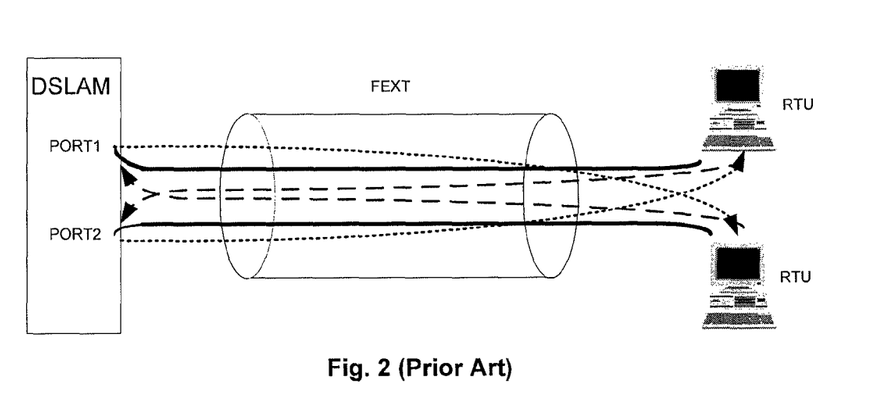
FIG. 2 shows the schematic diagram of FEXT.
Figure 3:
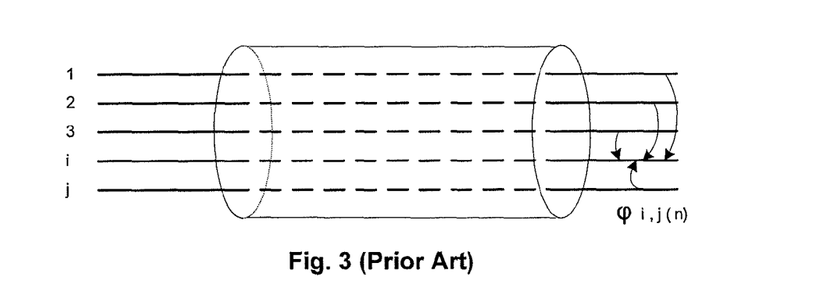
FIG. 3 shows a crosstalk model in the transmission of multiple communication lines.

As the frequency band in xDSL technology increases, however, crosstalk becomes a nuisance, especially in a high frequency band. There are near-end crosstalk (NEXT) and far-end crosstalk (FEXT), as shown in FIG. 1 and FIG. 2. NEXT does no significant harm to system performance while FEXT has a severe impact on line transmission.

For example, when xDSL services are activated for multiple subscribers in a bundle of cables, some lines may suffer from low transmission rate and instability or even xDSL services fail to be activated because of FEXT, leading to a low activation rate of the digital subscriber line access multiplexer (DSLAM).

Some operators have worked out their specifications on the management of spectrum applications to avoid crosstalk between devices in various locations. The technologies and methods currently used to address crosstalk issues include multi-subscriber detection technology, maximum likelihood multi-subscriber detection technology, and interference cancellation multi-subscriber detection technology.

The current technologies, however, are complicated and require a large amount of calculation. In addition, the technologies only optimize the performance of DSL lines or the system based on some statistic characteristics of crosstalk instead of providing quantitative crosstalk tests on multiple lines. As a result, the transmission performance of DSL lines cannot be optimized significantly.

SUMMARY OF THE INVENTION

The present invention discloses a method, apparatus, and system for crosstalk test on multi-subscriber communication lines so that crosstalk between multiple lines can be tested quantitatively to facilitate optimization of DSL line performance or system performance.

The objectives are achieved through the following technical solution.

An embodiment of the invention provides a method for crosstalk test on multi-subscriber communication lines. The method includes the following steps:

loading orthogonal spread spectrum codes to lines among the multi-subscriber communication lines and sending signals loaded with the orthogonal spread spectrum codes at the transmitting side, wherein the orthogonal spread spectrum codes correspond to the lines; and obtaining the crosstalk vector information according to the actual received signal vector and determining the quantitative value of the crosstalk from a certain line of the lines at the receiving side.

The method also includes that orthogonal spread spectrum codes are mapped to each of the lines among the multi-subscriber communication lines, further including:

labeling each of the lines, mapping labels to a group of orthogonal spread spectrum codes, and saving the mapping to a mapping table.

The step of loading orthogonal spread spectrum codes to the line under test further includes:

loading continuously the orthogonal spread spectrum codes corresponding to the lines into symbols on a tone or multiple tones of the lines, wherein on each of the lines each of the symbols is loaded with one or more bits of the orthogonal spread spectrum codes code corresponding to the line.

The step of obtaining crosstalk vector information based on the actual received signal vector includes:

obtaining the received signal vector containing crosstalk information from the received signals of each tone or line on the line under test by Fast Fourier Transform (FFT) at the receiving side of the line under test; and calculating the difference between the received signal vector and the expected received signal vector and taking the difference as the crosstalk information of the tone or line.

The step of determining the quantitative value of crosstalk by a certain line on the line under test includes:

despreading the crosstalk vector information of the tone or line by the corresponding orthogonal spread spectrum codes; and obtaining the quantitative value of the crosstalk from the certain line to the line under test or on the tone of the line under test according to the despreading result.

The despreading result is $$\sum_{i=1}^{L} b_i \Delta(a+jb)_i,$$

where L stands for the length of the orthogonal spread spectrum codes, $b_i$ for the orthogonal spread spectrum code corresponding to line i and $\Delta(a+jb)$ for the crosstalk vector information.

The step of obtaining the quantitative value of the crosstalk from the certain line to the line under test or to the tone of the line under test includes:

performing a MOD operation on the despreading result to obtain a quantitative value, and determining whether the value exceeds the preset threshold; if determining that the value exceeds the preset threshold, taking the value as the quantitative value of crosstalk from the certain line to the line under test; otherwise, determining that there is no crosstalk impact by the certain line on the line under test.

In an embodiment of the invention, when crosstalk test is performed on multiple tones of the line, the step of obtaining the quantitative value of the crosstalk from the certain line to the line under test or on the tones of the line under test also includes:

determining the despreading result on the next tone of the line under test, calculating and determining the quantitative value of the crosstalk from the certain line to the line under test until the despreading results of all tones of the line under test are obtained, and obtaining the crosstalk test results.

The method also includes:

obtaining the phase angle of the crosstalk signals on the line under test based on the despreading results and determining the phase characteristics based on the initial phase angle of the line under test.

An embodiment of the invention also provides a transmitting apparatus for crosstalk test on multi-subscriber communication lines, including:

a load signal configuration module, adapted to save the mapping between the line labels and the orthogonal spread spectrum codes and provide the test signal loading module with signals to be loaded; and a test signal loading module, adapted to load test signals based on the orthogonal spread spectrum codes corresponding to the test lines provided by the load signal configuration module and to send the test signals.

An embodiment of the invention also provides a receiving apparatus for crosstalk test in multi-subscriber communication lines, including:

a signal receiving and processing module, adapted to receive signals from the transmitting apparatus and obtain the received signal vector by FFT;

a crosstalk vector calculating module, adapted to calculate the crosstalk vector based on the received signal vector and the expected received signal vector of the receiving apparatus; and a crosstalk value calculating module, adapted to calculate the quantitative value of the crosstalk from a certain line to the line under test based on the crosstalk vector.

The crosstalk value calculating module includes:

a despreading module, adapted to despread the crosstalk vector and obtain the despreading result;

a value and phase calculating module, adapted to perform a MOD operation on the despreading result to obtain a quantitative value and a phase;

a judging module, adapted to judge whether crosstalk exists based on the MOD operation result and the preset threshold and to determine the quantitative value of the crosstalk.

An embodiment of the invention also provides a system for crosstalk test on multi-subscriber communication lines, including a transmitting apparatus and a receiving apparatus, wherein the transmitting apparatus sends test signals, and the receiving apparatus receives test signals and calculates the quantitative value of the crosstalk.

In the technical solution provided in an embodiment of the invention, a crosstalk source can be identified and the crosstalk value can be calculated. Crosstalk on multiple DSL lines can be tested in real time without impacting the transmission performance of the lines. Hence there is no interference with the operating lines and devices.

The test result shows how many lines have a significant impact on the line under test and reflects the severity of the impact, providing a powerful basis for dynamic spectrum management.

With the present invention, communication lines can provide a higher and more stable transmission rate and the overall performance of the system and the activation rate of the DSLAM can be enhanced.

DETAILED DESCRIPTION OF THE INVENTION

The main objectives of the present invention are to detect a crosstalk source and quantify a crosstalk. If crosstalk can be tested in real time on DSL devices, the DSL devices may respond to crosstalk in real time and thus avoid crosstalk between multi-subscriber DSL lines and provide data on crosstalk for optimizing the performance of DSLAM devices.

In practice, xDSL lines in the same bundle of cables may have crosstalk impacts on each other. The core idea of the present invention is to implement crosstalk test between multiple xDSL line pairs as well as crosstalk source identification and crosstalk quantification by code division.

The method provided in an embodiment of the present invention is hereinafter described in detail with reference to the accompanying drawings.

In Error! Reference source not found, $\emptyset\, i, j\, (n)$ indicates the crosstalk from line j to the n-th tone of line i. The total crosstalk energy on the nth tone of line i is $$\sum_{j=1}^{M} \phi_{i,j}(n),$$

where $\emptyset\, i, j\, (n)=0$ (i=j) and M is the number of lines.

Usually, the total crosstalk energy may be measured roughly in the silence period during line initialization. The total crosstalk energy on each tone can be used for estimating the performance of the line but not adaptable for the overall line optimization, which requires to depend on the crosstalk between every two lines in the system. Therefore, it is necessary to calculate the crosstalk between every two lines in the system, that is, the $\emptyset\, i, j\, (n)$ for each line in the system, where both i and j range from 1 to M.

Figure 4:
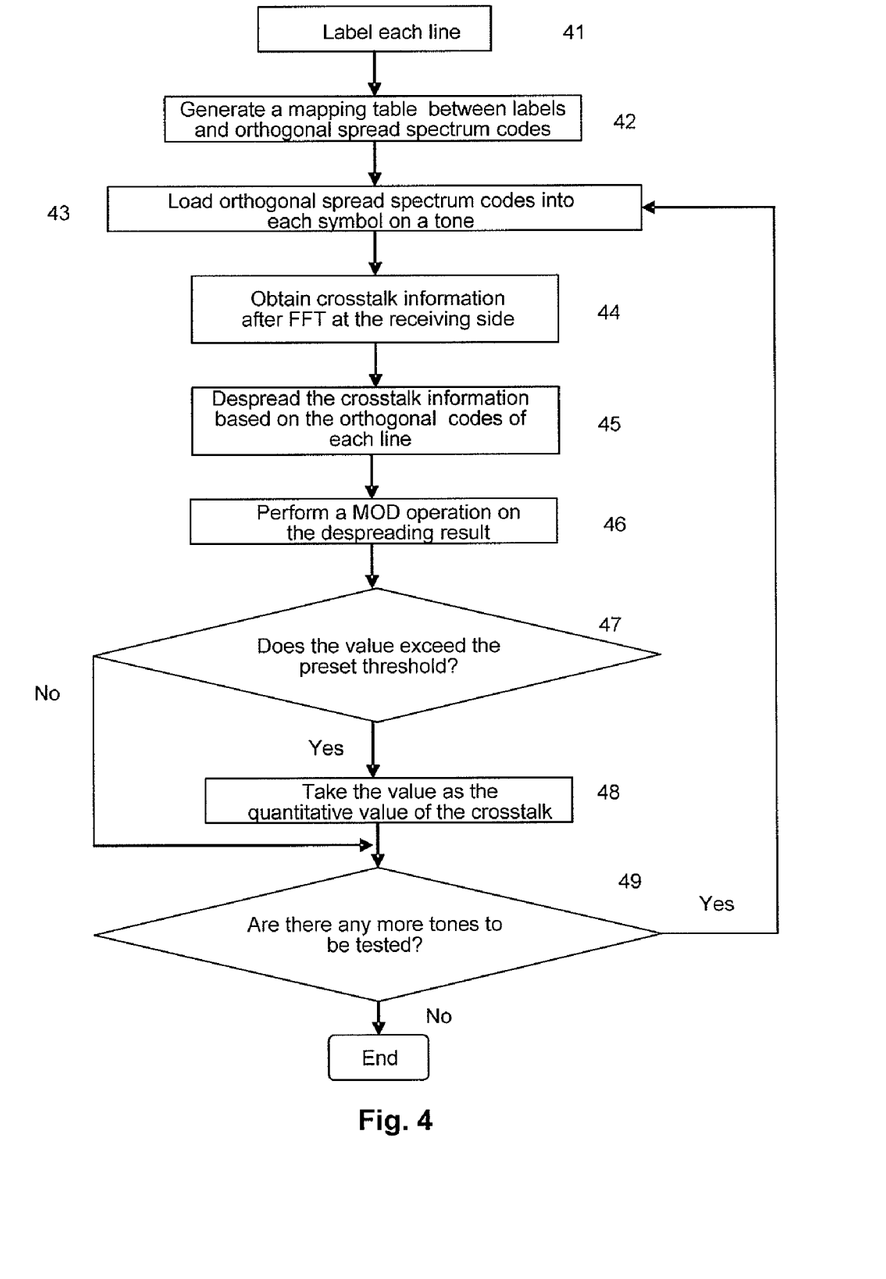
FIG. 4 shows the flow of realizing the method provided in an embodiment of the invention.

All other lines may have crosstalk impacts on a certain line at the same time. As shown in FIG. 4, line 1 to line j have crosstalk impacts on line i. The problem is how to identify separately the crosstalk from different lines to line i at the same time and how to identify a specific line that has an impact of crosstalk on line i.

In an embodiment of the present invention, labels are used for determining the crosstalk of every two lines in the system. In this way, the overall crosstalk signals can be derived from the sum of the crosstalk from each line and thus the crosstalk from each line to line i can be determined.

FIG. 4 shows the flow of realizing the method provided in an embodiment of the invention. The flow includes the following steps:

Step 41: Label the interfaces of the lines according to a certain sequence or rule so that different lines can be identified.

For example, label the lines from 1 to i and j. Other methods may also be adopted to label the lines. After the lines are labeled for identification, the crosstalk from each line can be calculated separately in subsequent steps.

Step 42: Map labels to a group of orthogonal spread spectrum codes to establish one-to-one correspondence where length of orthogonal spread spectrum codes is L, and save the mapping to a mapping table, as shown in Table 1.

TABLE 1

Mapping between labels and orthogonal spread spectrum codes

| | Line Label | | | | |
|---|---|---|---|---|---|
| | 1 | 2 | 3 | ... | n |
| Orthogonal Code | Orthogonal Code b1 | Orthogonal Code b2 | Orthogonal Code b3 | ... | Orthogonal Code bn |

Crosstalk test can then be performed by loading relevant orthogonal spread spectrum codes on different test channels (i.e. test lines identified by labels).

Step 43: FIG. 6 shows the loading of orthogonal spread spectrum codes on a certain tone of test channels shown in FIG. 5. Specifically, on the certain tone of one of the test channels, one bit of orthogonal spread spectrum code corresponding to the test channel is loaded into each symbol and L symbols is continuously loaded with bits of the orthogonal spread spectrum code, where L is the length of the orthogonal spread spectrum code.

Or on the certain tone of one of the test channels, k bits of orthogonal spread spectrum code corresponding t to the test channel are loaded into each symbol, and L/k symbols are continuously loaded with bits of the orthogonal spread spectrum code, where L/k indicates the number L divided by k. To ensure the realization of the method, L/k should be an integer.

Figure 5:
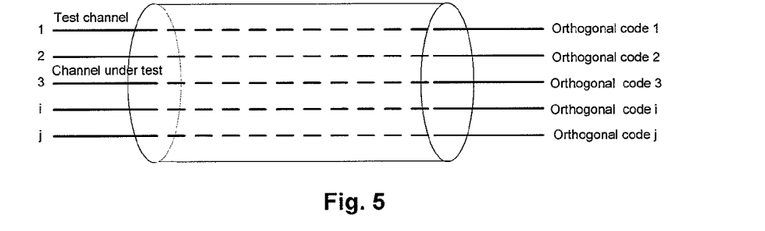
FIG. 5 shows the mapping of line labels to orthogonal codes.
Figure 6:
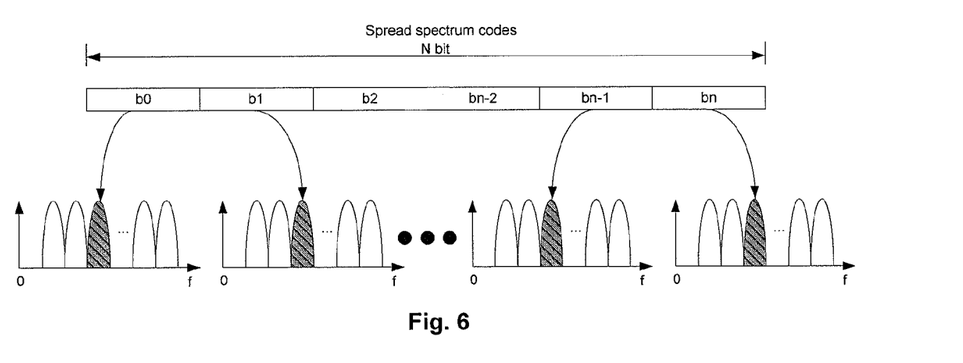
FIG. 6 shows the loading of spread spectrum codes.

For example, to detect the crosstalk from line 1 in FIG. 5, this step of loading orthogonal spread spectrum codes is implemented on line 1.

The code loaded to line 1 is the orthogonal code b1 corresponding to line 1 in Table 1.

Figure 7:
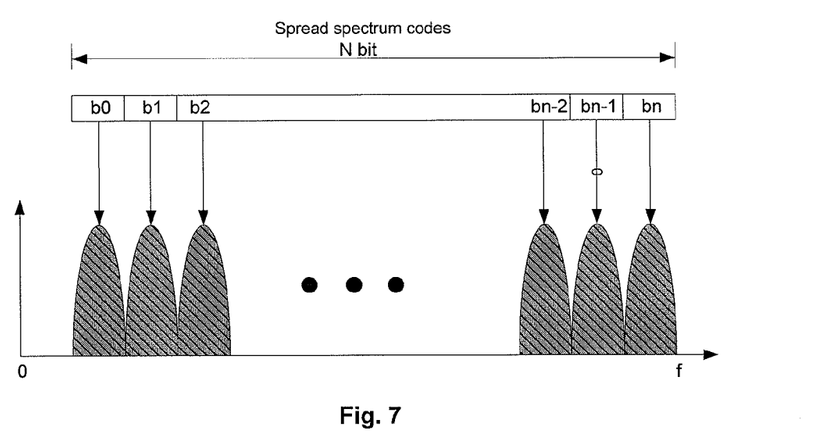
FIG. 7 shows the loading of spread spectrum codes in a symbol.

As shown in FIG. 7, the bits of spread spectrum code word are loaded into a symbol on respective tones, and at receiving side the despreading is performed for a symbol. The despreading result can reflect whether there are impacts of crosstalk and the severity of the crosstalk on the line under test, but not reflect whether there are impacts of crosstalk on a certain tone and the severity of the crosstalk on the certain tone at the receiving side. This method is simple and saves time, thus playing an important role in qualitative analysis.

Step 44: Obtain the received signal vector containing crosstalk information by Fast Fourier Transform (FFT) and determine the crosstalk vector in the customer premises equipment (CPE) connected to the channel under test.

The transmit vector Y of the channel under test is stretched and rotated to X under the impact of the crosstalk and noises from other lines. The channel under test can be any one of line 2 to line i and line j.

Figure 8:
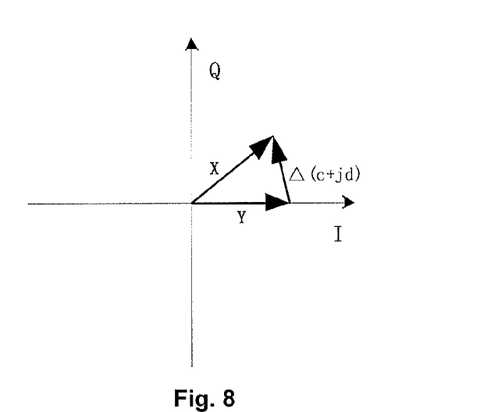
FIG. 8 shows the modulation and reception of a vector.

As shown in FIG. 8, the crosstalk vector Δ(a+jb), which includes crosstalk from other lines to the line under test, is the difference between the signal vectors X and Y.

Calculate the received signal vector, and determine the crosstalk vector according to the received signal vector and the expected received signal vector at the receiving side.

Step 45: Despread the crosstalk vector Δ(a+jb) with the orthogonal codes corresponding to each line according to the mapping table in step 42.

Figure 9:
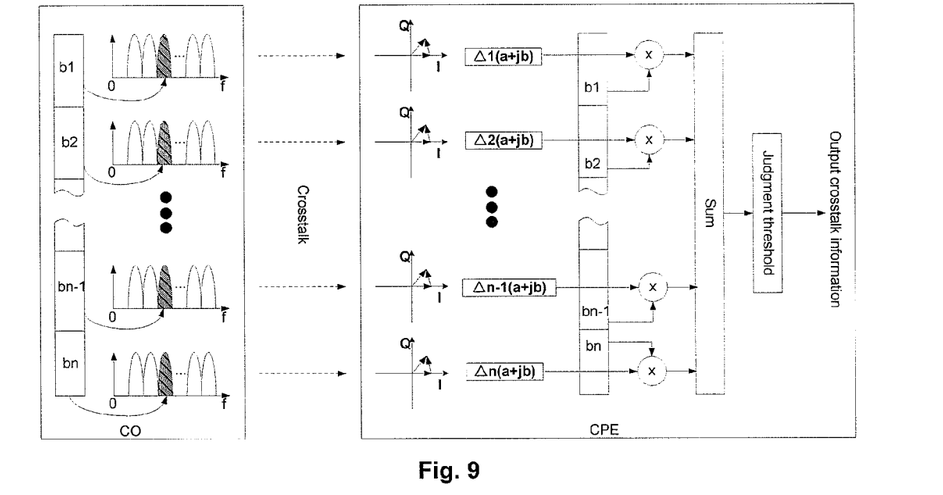
FIG. 9 shows the flow of signals in the method for crosstalk test.

The despreading of a crosstalk vector is shown in FIG. 9. The formula is as follows:

$$\sum_{i=1}^{L} b_i \Delta(a+jb)_i,$$

where, L stands for the length of orthogonal spread spectrum codes and bi for orthogonal spread spectrum code in Table 1, i.e orthogonal code.

Step 46: Perform a MOD operation on the despreading result (a complex number).

Step 47: Judge whether the MOD operation result exceeds the preset threshold. If yes, execute step 48; otherwise, execute step 49.

Step 48: Determine that a certain test channel has an impact of crosstalk on the channel under test, take the MOD operation result as the relative quantitative value of the crosstalk and execute step 49.

That is, judge whether a certain test channel has an impact of crosstalk according to the despreading result, and determine the quantitative value of the crosstalk from the certain test channel to the channel under the test according to the MOD operation result and the line label corresponding to the orthogonal spread spectrum code in the calculation.

For example, if the despreading result in step 45 is obtained based on the orthogonal code b2 of line 2 and the result exceeds the preset threshold, then line 2 has an impact of crosstalk on line under test where the crosstalk occurs on the tone loaded in step 43 and the MOD operation result calculated based on the despreading result may be taken as the relative quantitative value of the crosstalk.

In the method provided in an embodiment of the invention, the despreading result in step 45 may also be used to calculate the phase characteristic of the crosstalk. For example, if the result in step 45 is α+jβ, the phase angle of crosstalk signals on the line under test can be worked out using the formula Ø1=arctag (β/α). The initial phase angle of the line under test (or the channel under test), Ø0, is known and therefore, the phase change of the crosstalk is Ø1-Ø0, that is, the phase characteristic.

Step 49: Judge whether the crosstalk on all tones of the line is quantified. If not, execute step 43; otherwise, end this test with the quantitative value of the crosstalk and the phase characteristic.

Figure 10:
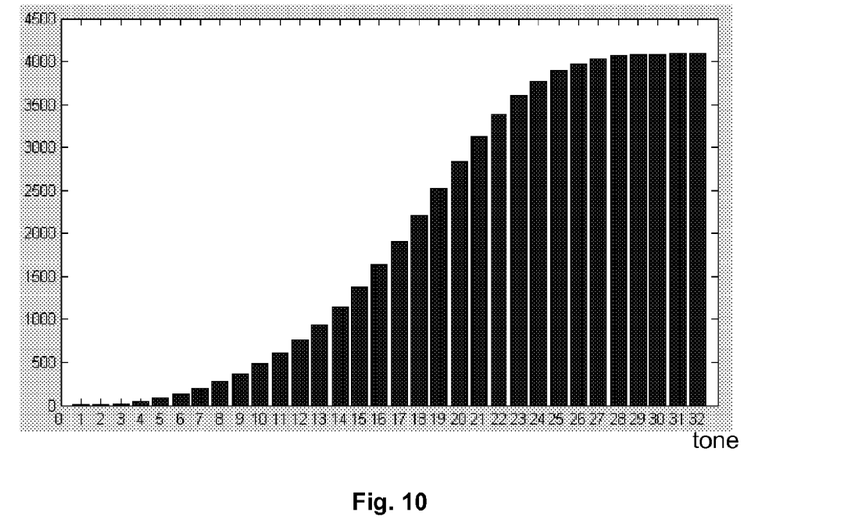
FIG. 10 shows the result of a crosstalk test on a single line.

It must be noted that as shown in FIG. 10, the crosstalk on all tones and their quantitative value may be obtained at one time by transmitting orthogonal spread spectrum codes on each tone at the same time in step 43.

Figure 11:
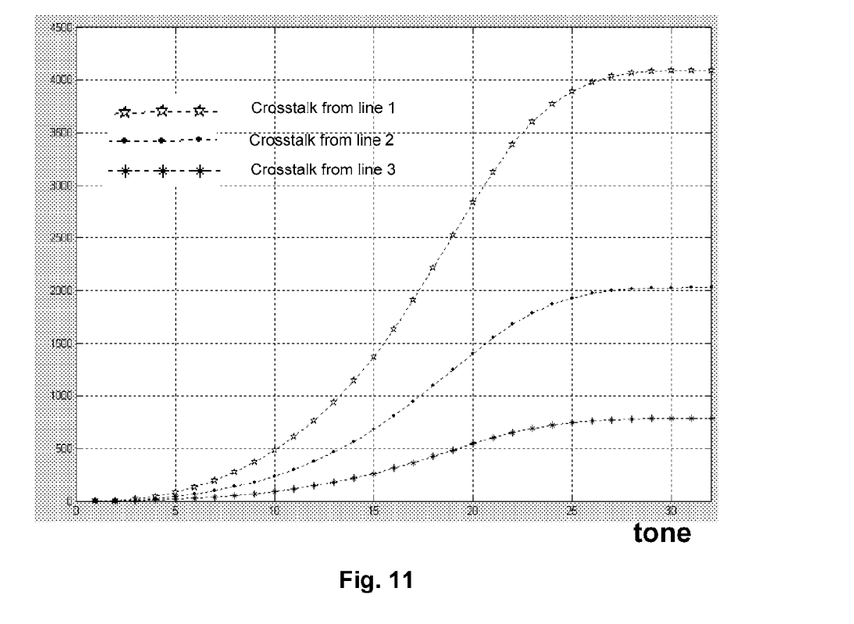
FIG. 11 shows the result of a crosstalk test on multiple lines.

In an embodiment of the invention, crosstalk test may be performed on any line in multiple communication lines. For example, three communication lines have crosstalk impacts on a certain line, and as shown in FIG. 11, the three curves record the result of the crosstalk test on the three lines.

Figure 12:
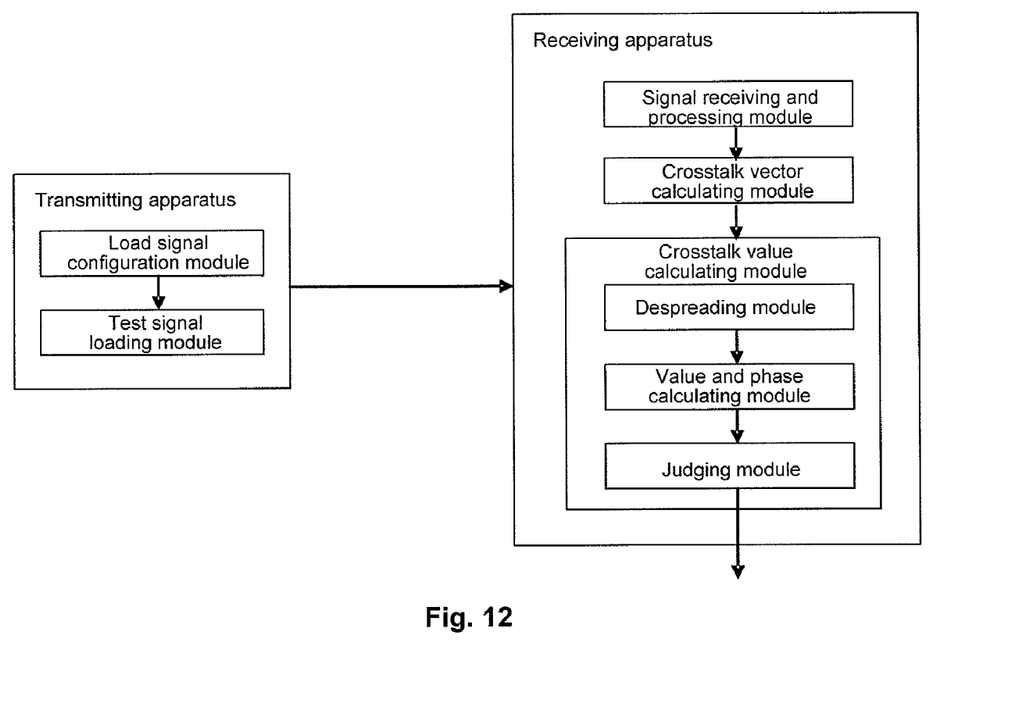
FIG. 12 shows the structure of the system provided in an embodiment of the invention.

An embodiment of the invention also provides a system for crosstalk test on multi-subscriber communication lines, as shown in FIG. 12. The system includes a transmitting apparatus and a receiving apparatus. The transmitting apparatus sends test signals, and the receiving apparatus receives test signals and calculates the quantitative value of the crosstalk.

The apparatuses are hereinafter described in detail.

1. The transmitting apparatus for crosstalk test on multi-subscriber communication lines includes:

a load signal configuration module, adapted to save the mapping between the line labels and the orthogonal spread spectrum codes, the mapping information shown in Table 1, and to provide a test signal loading module with the signals to be loaded (the detailed method for loading configuration is omitted herein for the above-description); and the test signal loading module, adapted to load test signals based on the orthogonal spread spectrum codes corresponding to the test line provided by the load signal configuration module, and to send the test signals to the receiving apparatus (the specific process for loading can be determined according to requirements and the detailed method for loading is omitted herein for the above-description).

2. The receiving apparatus for crosstalk test on multi-subscriber communication lines includes:

a signal receiving and processing module, adapted to receive signals from the transmitting apparatus and work out the signal vector by FFT;

a crosstalk vector calculating module, adapted to calculate the crosstalk vector based on the received signal vector and the expected received signal vector; that is, the difference between the received signal vector and the expected received signal vector is the crosstalk vector;

a crosstalk value calculating module, adapted to calculate the quantitative value of the crosstalk from a certain line to the line under test based on the crosstalk vector, furthering including:

a despreading module, adapted to despread the crosstalk vector and obtain the despreading result (the detailed method is shown in FIG. 9 and is omitted herein);

a value and phase calculating module, adapted to perform a MOD operation on the despreading result to obtain a MOD value and a phase, wherein the phase is the phase characteristic of the crosstalk and the MOD value is taken as the quantitative value of the crosstalk; and a judging module, adapted to judge whether crosstalk exists according to the MOD operation result and the preset threshold, and to determine the quantitative value of the crosstalk, for example, determine that crosstalk exists and taking the MOD operation result as the quantitative value of the crosstalk if the MOD operation result exceeds the preset threshold; otherwise, determine that there is no crosstalk.

In an embodiment of the present invention, a crosstalk source can be identified and crosstalk can be quantified. The realization of an embodiment does not impact the transmission performance of the lines, hence no interference with operating lines and devices. The test result shows how many lines have a significant impact on the line under test and reflects the severity of the impact, providing a powerful basis for dynamic spectrum management.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

The invention claimed is:

1. A method for crosstalk test on multi-subscriber communication lines, comprising:

loading orthogonal codes to lines among the multi-subscriber communication lines and sending signals loaded with the orthogonal codes at a transmitting side, the orthogonal codes corresponding to the lines; and obtaining a crosstalk vector information according to an actual received signal vector and determining the quantitative value of a crosstalk from a certain line of the lines at a receiving side;

wherein the step of determining the quantitative value of crosstalk by the certain line further comprises: performing an operation on the crosstalk vector information of the tone or line and obtaining the quantitative value of the crosstalk from the certain line to the line under test or on the tone of the line under test according to the result of the operation on the crosstalk vector information;

wherein the result of the operation on the crosstalk vector information is $$\sum_{i=1}^{L} b_i \Delta(a+jb)_i,$$

where L stands for the length of the orthogonal codes, $b_i$ for the orthogonal code corresponding to line i and $\Delta(a+jb)$ for the crosstalk vector information.

2. The method of claim 1, wherein the orthogonal codes are mapped to each of the lines among the multi-subscriber communication lines, comprising:

labeling each of the lines, mapping labels to a group of the orthogonal codes, and saving the mapping to a mapping table.

3. The method of claim 1, wherein the step of loading orthogonal codes further comprises:

loading continuously the orthogonal codes corresponding to the lines into symbols on a tone or multiple tones of the lines, wherein on each of the lines each of the symbols is loaded with one or more bits of the orthogonal code corresponding to the line.

4. The method of claim 3, wherein the step of obtaining crosstalk vector information based on the actual received signal vector further comprises:

obtaining the received signal vector containing crosstalk information from the received signals of each tone or line on the line under test by Fast Fourier transform (FFT) at the receiving side of the line under test; and calculating the difference between the received signal vector and an expected received signal vector and taking the difference as the crosstalk information on a certain tone or the line under test.

5. The method of claim 1, wherein the step of obtaining crosstalk vector information based on the actual received signal vector further comprises;

obtaining the received signal vector containing crosstalk information from the received signals of each tone or line on the line under test by Fast Fourier transform (FFT) at the receiving side of the line under test; and calculating the difference between the received signal vector and an expected received signal vector and taking the difference as the crosstalk information on a certain tone or the line under test.

6. The method of claim 1, wherein the step of obtaining the quantitative value of the crosstalk from the certain line to the line under test or on the tone of the line under test further comprises:

performing a MOD operation on the result of the operation on the crosstalk vector information to obtain a quantitative value with the corresponding orthogonal codes, and determining whether the value exceeds the preset threshold; if determining that the value exceeds the preset threshold, taking the value as the quantitative value of crosstalk from the certain line to the line under test; otherwise, determining that there is no crosstalk impact by the certain line on the line under test.

7. The method of claim 6, wherein when crosstalk on multiple tones of the line under test is detected, the step of obtaining the quantitative value of the crosstalk from the certain line to the line under test or on the tones of the line under test also comprises:

determining the result of the operation on the crosstalk vector information on the next tone of the line under test, calculating and determining the quantitative value of the crosstalk from the certain line to the next tone of the line under test until the results of the operation on the crosstalk vector information of all the multiple tones of the line under test are obtained, and obtaining the crosstalk test results.

8. The method of claim 1, further comprising:

obtaining the phase angle of the crosstalk signals on the line under test based on the results of the operation on the crosstalk vector information and determining the phase characteristics based on an initial phase angle of the line under test.

9. A receiving apparatus for multi-subscriber communication lines, comprising:

a signal receiving and processing module, adapted to receive signals from a transmitting apparatus and obtain a received signal vector by Fast Fourier Transform (FFT);

a crosstalk vector calculating module, adapted to calculate a crosstalk vector based on the received signal vector and an expected received signal vector of the receiving apparatus; and a crosstalk value calculating module, adapted to calculate a quantitative value of a crosstalk from a certain line to the line under test based on the crosstalk vector according to orthogonal codes corresponding to lines among multi-subscriber communication lines;

wherein the crosstalk value calculating module comprises:

a despreading module, adapted to perform an operation on the crosstalk vector and obtain the result of the operation on the crosstalk vector;

a value and phase calculating module, adapted to perform a Modulo (MOD) operation on the result of the operation on the crosstalk vector information to obtain a MOD value and a phase characteristic of the crosstalk; and a judging module, adapted to judge whether crosstalk exists based on the MOD value and a preset threshold and to determine the quantitative value of the crosstalk.

10. A system for multi-subscriber communication lines, comprising a transmitting apparatus and a receiving apparatus, wherein the transmitting apparatus sends test signals loaded with orthogonal codes to lines among the multi-subscriber communication lines, and the receiving apparatus receives test signals and calculates the quantitative value of a crosstalk by the corresponding orthogonal codes;

wherein calculating the quantitative value of the crosstalk further comprises: performing an operation on a crosstalk vector information of the tones or lines; and obtaining the quantitative value of the crosstalk from the certain line to the line under test or on the tone of the line under test according to the result of the operation on the crosstalk vector information;

wherein the result of the operation on the crosstalk vector information is $$\sum_{i=1}^{L} b_i \Delta(a+jb)_i,$$

where L stands for the length of the orthogonal codes, $b_i$ for the orthogonal code corresponding to line i and $\Delta(a+jb)$ for the crosstalk vector information.

11. The system of claim 10, wherein the transmitting apparatus is a digital subscriber line access multiplexer (DSLAM), and the receiving apparatus is a customer premises equipment (CPE).

* * * * *